Nov. 3, 1925.

W. WARD

FUEL SPREADER

Filed Jan. 26, 1925

Inventor
Wilburt Ward
By Brown & Phelps
Attorneys

Nov. 3, 1925.                                                    1,559,817
W. WARD
FUEL SPREADER
Filed Jan. 26, 1925            2 Sheets-Sheet 2
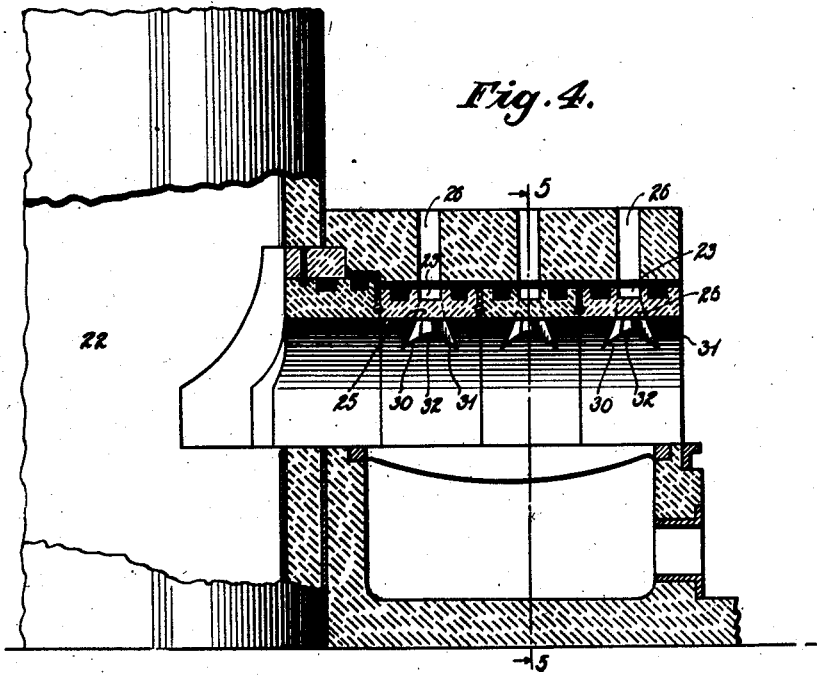
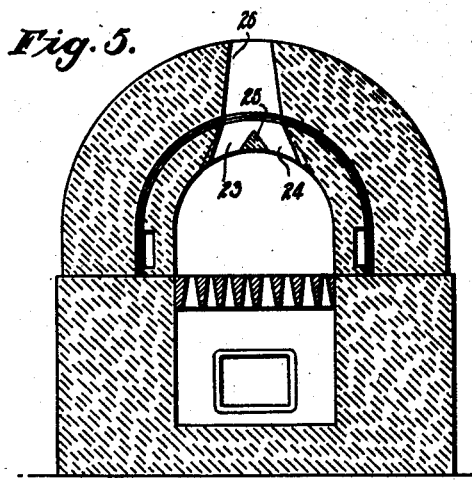 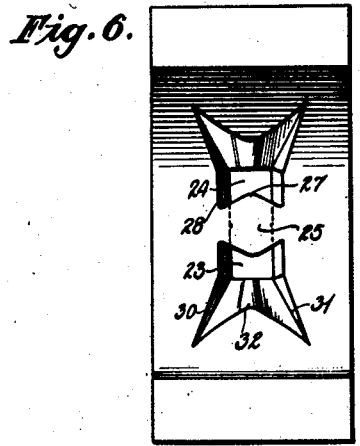
Inventor
Wilburt Ward
By Brown & Phelps
Attorneys Patented Nov. 3, 1925.

1,559,817

UNITED STATES PATENT OFFICE.

WILBURT WARD, OF STE. GENEVIEVE, MISSOURI.

FUEL SPREADER.

Application filed January 26, 1925. Serial No. 4,842.

*To all whom it may concern:*

Be it known that I, WILBURT WARD, a citizen of the United States, residing at Ste. Genevieve, in the county of Ste. Genevieve and State of Missouri, have invented certain new and useful Improvements in Fuel Spreaders, of which the following is a specification.

The invention relates to fuel spreaders and has as an object the provision of a spreader adapted to be used in stoking furnaces.

An object of the invention is the provision of a spreader which, though acting without moving parts, will spread fuel evenly over the grate bars.

A further object of the invention is the provision of a spreader which may be built into the masonry of a furnace and form part thereof.

A further object of the invention is the provision of a fuel spreader that will serve to shield the fuel-delivering means from the direct glare of the heat of the furnace.

Further objects of the invention will appear in the following description, when read in connection with the accompanying drawing, showing illustrative embodiments of the invention and wherein—

Fig. 4 is a vertical longitudinal section of a form of the device applied to a furnace adapted to the heating of a kiln;

Fig. 5 is a transverse section on line 5—5 of Fig. 4; and

Fig. 6 is a bottom plan view of one of the spreading elements of Fig. 4.

Figure 1:
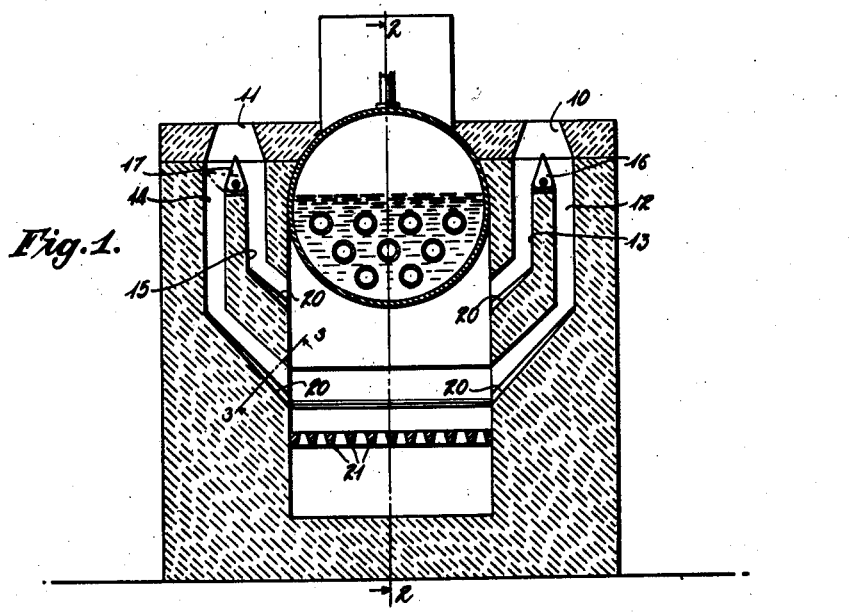
Fig. 1 is a vertical transverse section of the device applied to a furnace for heating a boiler.
Figure 2:
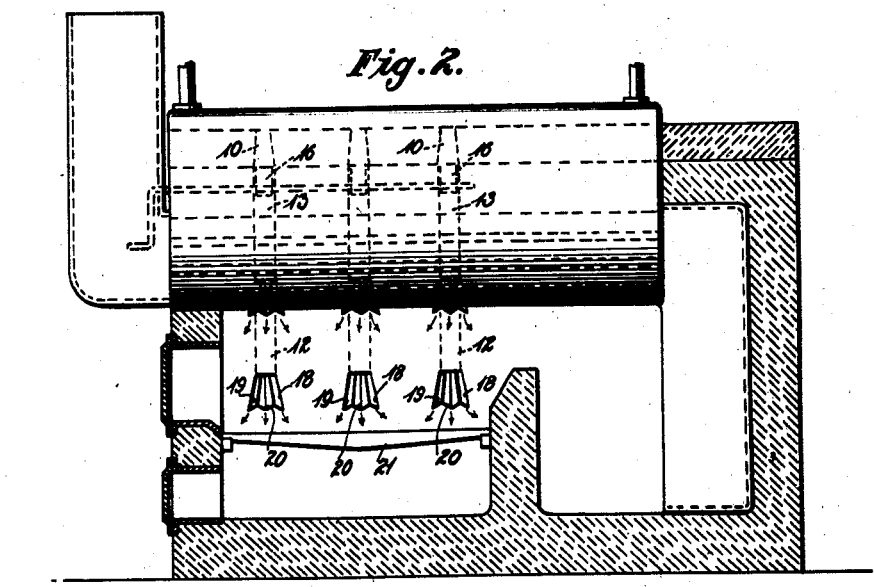
Fig. 2 is a longitudinal section on line 2—2 of Fig. 1.
Figure 3:
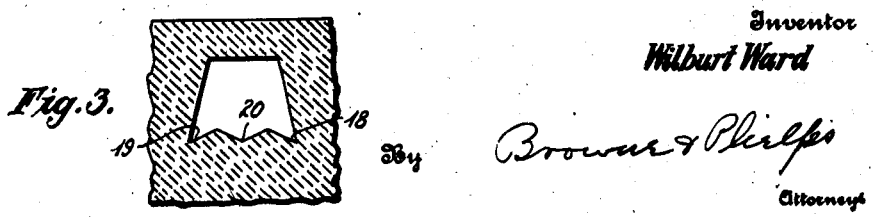
Fig. 3 is a detail section on line 3—3 of Fig. 1.

As shown in Figs. 1 to 3 inclusive, there are provided openings 10, 11 for the admission of fuel to channels 12, 13, 14, 15.

To apportion the fuel to the companion channels 12, 13 and 14, 15, there are shown wedge members 16, 17 placed at the juncture of the paired channels.

The channels 12, 14 are adapted to deliver their fuel adjacent the lateral furnace walls, while the channels 13, 15 opening through these walls at higher points, are adapted to deliver the fuel toward the center of the grate bars.

To distribute the fuel laterally of the channels and longitudinally of the grate bars, there are shown diverging grooves 18, 19 at the outlet of each of the channels 12 to 15 inclusive, together with a central groove 20 at each outlet. The angle, depth, and width of the grooves are properly adjusted to provide an even distribution of the fuel over the grate bars 21 of the furnace.

As shown in Figs. 4 to 6 inclusive, the invention is applied to a furnace for heating a kiln 22, and is applied to the furnace disclosed in my Patent No. 1,480,973, dated January 15, 1924. In this form of the invention, there being no boiler present over the grate bars, the spreader is placed in the crown of the arch and the separate channels 23, 24, corresponding to 12 to 15 inclusive of Fig. 1, are very much shortened.

The wedge-shaped member 25 is constructed with its lower surface falling in the surface of the arch. The channel 26 leading to the member 25 is formed with downwardly diverging sides to prevent the fuel clogging therein. The wedge-shaped member in this form of the device, as indicated in Fig. 6, has its base formed wider at the central portion 27 than at its ends 28, 29, whereby to spread the fuel which falls at the center of the grate bars to some extent.

The openings of the channels 23, 24 laterally are formed with grooves of the nature of those at 18, 19 and 20, in this instance, however, providing grooves 30, 31 at the outsides of the delivery with a central ridge 32 to provide a proper longitudinal distribution of the fuel upon the grate bars.

Some of the fuel from the delivery channels 23, 24 will strike the side walls of the furnace and ricochet to supply fuel to the position mid-way between the center and the sides. This action, together with the form of the wedge-shaped member 25 and the grooves 30, 31 is found to give a sufficiently even distribution of fuel to provide for proper maintenance of fire.

Minor changes may be made in the physical embodiment of the invention and any desired device may be used to deliver fuel to the device without departing from the spirit of the invention.

I claim:

1. In a furnace, in combination, a furnace wall provided with a fuel admitting passage and diverging channels leading downwardly therefrom to deliver fuel upon the grate of the furnace, each of said channels being formed in one of the surfaces thereof at its outlet with diverging fuel deflecting grooves.

2. A furnace comprising, in combination, a furnace wall having a fuel admitting passage and downwardly diverging branches leading from said passage and opening above the grate of the furnace, each of said passages adjacent its outlet into the furnace being formed with fuel deflecting grooves diverging transversely of said branch divergence and adapted to spread fuel escaping from the passage over the grate.

3. A furnace comprising, in combination, a furnace wall formed with a downwardly directed fuel admitting passage, and branch passages forming continuations of said passage in a downward direction, the plane of said branch being transverse to the axis of the furnace, a surface of each branch adjacent its opening into the furnace being formed with fuel deflecting grooves diverging in a direction parallel with the axis of the furnace, whereby to distribute fuel substantially uniformly over the grate.

WILBURT WARD.